United States Patent [19]
Ma

[11] Patent Number: 5,655,364
[45] Date of Patent: Aug. 12, 1997

[54] CONTROL SYSTEM FOR AN INTERNAL COMBUSTION ENGINE

[76] Inventor: Thomas Tsoi-Hei Ma, 1 Collingwood Road, South Woodham Ferrers, Essex, United Kingdom

[21] Appl. No.: 446,805
[22] PCT Filed: Jul. 20, 1994
[86] PCT No.: PCT/GB93/02456
§ 371 Date: Jun. 1, 1995
§ 102(e) Date: Jun. 1, 1995
[87] PCT Pub. No.: WO94/12779
PCT Pub. Date: Jun. 9, 1994

[30] Foreign Application Priority Data

Dec. 1, 1992 [GB] United Kingdom .................. 9225078

[51] Int. Cl.$^6$ ............................................... F01N 3/28
[52] U.S. Cl. ............................................. 60/284; 60/300
[58] Field of Search ....................... 60/286, 300, 274, 60/284

[56] References Cited

U.S. PATENT DOCUMENTS

| H1113 | 12/1992 | Yoshizaki | 60/284 |
| 4,656,829 | 4/1987 | Creps | 60/277 |
| 5,303,168 | 4/1994 | Cullen | 123/425 |

*Primary Examiner*—Douglas Hart

[57] ABSTRACT

A control system (14) is described for an internal combustion engine having a catalytic converter and a heater (12) for raising the temperature of the catalyst in the catalytic converter. The control system comprising an electrical circuit (16) for estimating, rather than measuring, the temperature of the catalyst and means for controlling the heater (12) of the catalytic converter based on the estimated catalyst temperature.

5 Claims, 1 Drawing Sheet

CONTROL SYSTEM FOR AN INTERNAL COMBUSTION ENGINE

This application has been filed under 35 USC 371 for the invention described and claimed in international application number PCT/GB93/02456, filed Nov. 30, 1993.

FIELD OF THE INVENTION

The present invention relates to a control system for an internal combustion engine having a catalytic converter and heating means for raising the temperature of the catalyst in the catalytic converter.

BACKGROUND OF THE INVENTION

In an engine which has means for heating the catalytic converter, be it an afterburner or an electrical heating element, a system is required for controlling the heating means in order to avoid possible damage to the catalytic converter through overheating. The control system should, for example, switch off the heating means once the catalytic converter has reached its light off temperature, prevent the heating from working during a warm start, and reactivate the heating means if the catalytic converter should drop below its light off temperature through prolonged low load operation of the engine.

Clearly, it is possible to make a direct measurement of the temperature of the catalytic converter. This of course is disadvantageous from the point of view of cost but a more serious objection to the use of a temperature sensor is the issue of reliability. Proposed legislation requires vehicles to comply with emission regulations not only when they are first manufactured but also after several tens of thousands of miles of use (currently 50,000 miles, 100,000 miles in the future) and the lifetime of a sensor operating in such a hostile environment cannot be guaranteed over such a period.

OBJECT OF THE INVENTION

The object of the present invention is therefore to provide a control system that will safeguard the durability of the catalytic converter and at the same time ensure effective operation of the catalyst when needed, which system does not rely on direct measurement of the temperature of the catalytic converter.

SUMMARY OF THE INVENTION

According to the present invention, there is provided a control system for an internal combustion engine having a catalytic converter and heating means for raising the temperature of the catalyst in the catalytic converter, the control system comprising an electrical circuit for estimating the temperature of the catalyst and means for controlling the heating means of the catalytic converter based on the estimated catalyst temperature, wherein the electrical circuit for estimating the temperature of the catalyst comprises a storage means for storing a signal indicative of the estimated catalyst temperature and means for modifying the stored signal to take into account the difference between the estimated exhaust gas temperature and the estimated catalyst temperature, the heating effect of the heating means and the heat lost by the catalyst to the ambient atmosphere.

The storage means may be a capacitor and the means for modifying the stored charge may comprise charging and discharging resistors. Such an embodiment has the advantage of ease of calibration. The various sources of heat loss and heat gain, be they conduction, convection or radiation, can each be simulated by a separate resistor and each may readily be set by a calibration engineer.

Alternatively, the storage means may be a digital memory and the means for modifying the value stored in the memory may comprise a digital processor programmed to increment and decrement the stored value in accordance with any mathematical model designed to emulate the temperature changes in the catalyst.

In a preferred embodiment of the invention, the means for modifying the value of the stored signal comprise means for estimating the temperature of the exhaust gases arriving at the catalytic converter after having passed through a pipe of the exhaust system, the exhaust gas temperature at the catalytic converter being estimated by taking into account the quantity of fuel burnt in the engine combustion chambers, the estimated temperature of the exhaust pipe and the thermal capacity of the exhaust gases.

The temperature of the exhaust pipe may be estimated by a further storage means for storing a signal which indicates the estimated exhaust pipe temperature, means for modifying the stored signal with heating parameters related to the temperature and the thermal capacity of the exhaust gases flowing through the exhaust pipe and means for diminishing the stored signal with heat loss parameters related to the difference between the estimated exhaust pipe temperature and the ambient temperature.

BRIEF DESCRIPTION OF THE DRAWINGS

The invention will now be described further, by way of example, with reference to the accompanying drawings, in which.

DETAILED DESCRIPTION OF THE INVENTION

Figure 1:
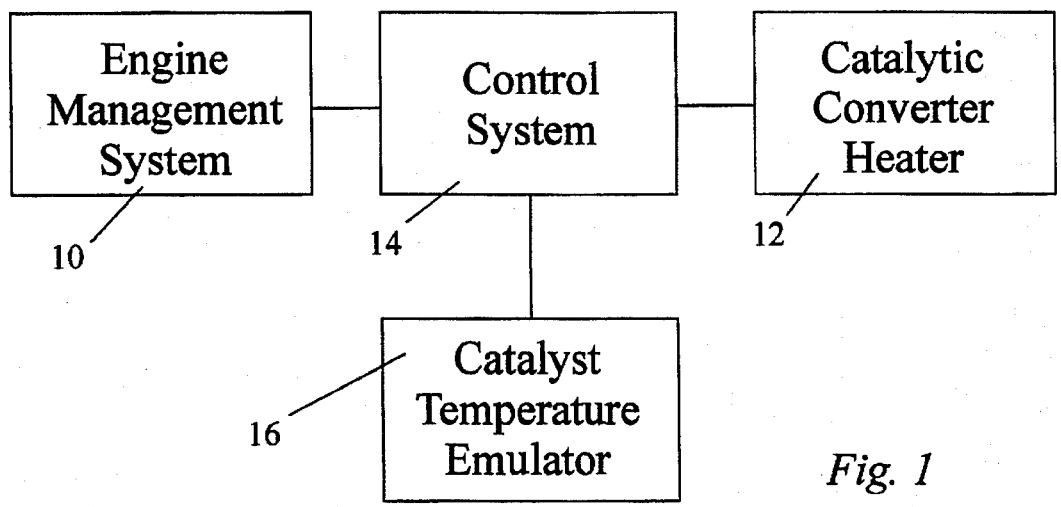
FIG. 1 is a block diagram an engine management and heater control system.

In FIG. 1, the block designated 10 represents an engine management system which electronically controls the fuelling and spark timing of an engine in a known manner. The engine is provided with a catalytic converter having a heater 12 which may be an electric heater or an afterburner. A control system 14 connected to the engine management system 10 controls the heater 12 to ensure that the catalytic converter lights off as quickly as possible without overheating. The control system compares a signal received from an emulator 16 with a reference value and operates the heater 12 accordingly. An emulator 16 is used instead of a temperature probe, both in order to reduce costs and to achieve higher reliability.

Figure 2:
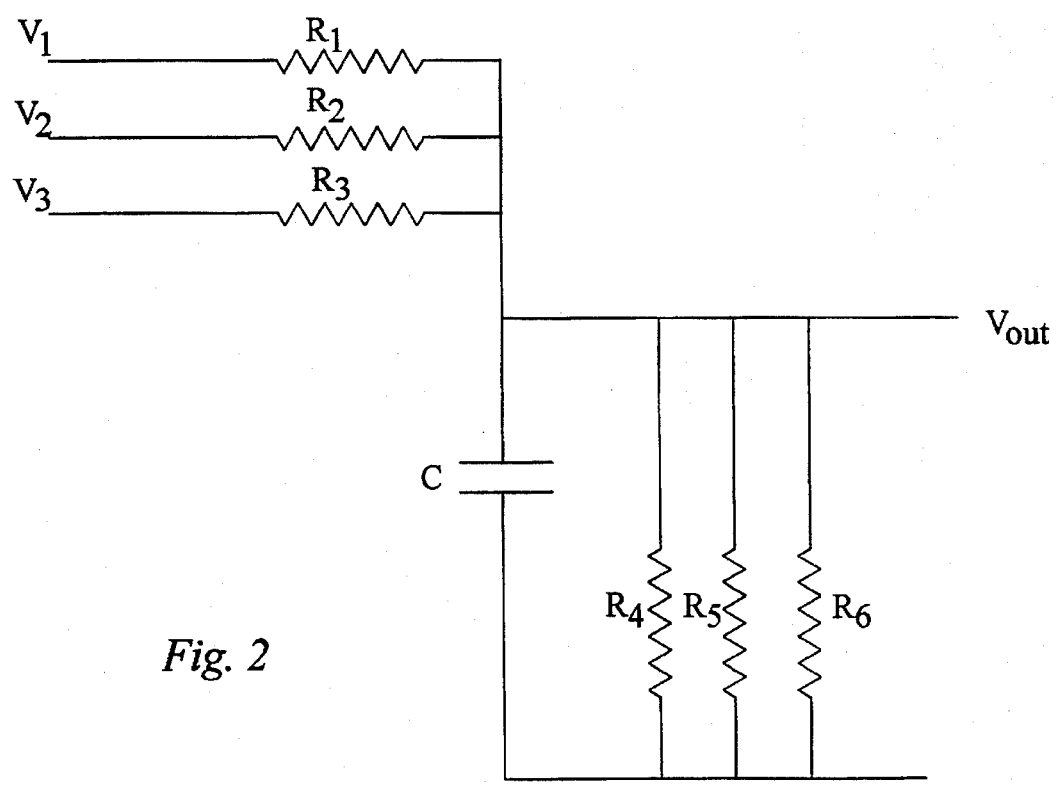
FIG. 2 is a circuit diagram of a catalytic converter temperature emulator.

The catalytic converter temperature emulator 16 may be constructed as shown in FIG. 2. This circuit comprises a capacitor C which represents the thermal capacity of the catalytic converter. Various charging resistors $R_1$, $R_2$ and $R_3$ charge the capacitor C from respective voltage source $V_1$, $V_2$ and $V_3$. At the same time, the capacitor C is discharged by various discharge resistor $R_4$, $R_5$, $R_6$.

The voltage across the capacitor is at all times an estimate of the catalytic converter temperature. To this end, the voltages $V_1$, $V_2$, $V_3$ represent the various sources of heat, such as the combustion gases and the heater 12 or the chemical catalytic reaction taking place within the converter. The values of the resistors $R_1$, $R_2$ and $R_3$ in combination with the value of capacitor C determine the time constant with which the voltage of the capacitor rises, these values being calibrated to correspond to the rate at which the temperature of the catalytic converter rises. $R_4$, $R_5$ and $R_6$ on the other hand represent the sources of heat loss, such as conduction, convection and radiation and their values are also calibrated to correspond with the cooling of the catalytic converter. Even when the engine is switched off, the capacitor voltage will vary to reflect the cooling of the catalytic converter.

The control system can therefore at all times be supplied with an estimate of the catalytic converter temperature. This will allow the control system to switch off the heater 12 or prevent it from switching on if the catalytic converter temperature is estimate to be above the light off value and to switch on the heater if the catalytic converter temperature is estimated to have dropped below the light off value, for example as a result of a prolonged idling period with the vehicle at a standstill.

It will be clear without detailed description to a person skilled in the art that the operation of an RC circuit can be emulated in software and that the estimation of the temperature can be carried out by a suitably programmed computer, which may be the engine management computer. It is important in this case however noted that the memory in which the estimated temperature is stored should remain active even when the engine is switched off. It is possible to continue to estimate the temperature of the catalytic converter if when the engine is switched off but this may place an unnecessary load on the vehicle battery. It would be equally viable to re-estimate the current temperature from data stored in non-volatile memory to represent the catalytic converter temperature, the ambient temperature and the time at which the engine was switched off.

I claim:

1. A control system for an internal combustion engine having a catalytic converter and heating means for raising the temperature of the catalyst in the catalytic converter, the control system comprising an electrical circuit for estimating the temperature of the catalyst and means for controlling the heating means of the catalytic converter based on the estimated catalyst temperature, wherein the electrical circuit for estimating the temperature of the catalyst comprises a storage means for storing a signal indicative of the estimated catalyst temperature, means for modifying the stored signal to take into account the difference between the estimated exhaust gas temperature and the estimated catalyst temperature, the heating effect of the heating means and the heat lost by the catalyst to the ambient atmosphere.

2. A control system as claimed in claim 1, wherein the storage means is a capacitor add the means for modifying the stored charge comprises charging and discharging resistors.

3. A control system as claimed in claim 1, wherein the storage means is a digital memory and the means for modifying the value stored in the memory comprises a digital processor programmed to increment and decrement the stored value in accordance with a mathematical model designed to emulate the temperature changes in the catalyst.

4. A control system as claimed in any preceding claim, wherein the means for modifying the value of the stored signal comprises means for estimating the temperature of the exhaust gases arriving at the catalytic converter after having passed through a pipe of the exhaust system, the exhaust gas temperature at the catalytic converter being estimated while taking into account the quantity of fuel burnt in the engine combustion chambers, the estimated temperature of the exhaust pipe and the thermal capacity of the exhaust gases.

5. A control system as claimed in claim 4, wherein the temperature of the exhaust pipe is estimated by a further storage means for storing a signal which indicates the estimated exhaust pipe temperature, means for modifying the stored signal with heating parameters related to the temperature and the thermal capacity of the exhaust gases flowing through the exhaust pipe and means for diminishing the stored signal with heat loss parameters related to the difference between the estimated exhaust pipe temperature and the ambient temperature.

* * * * *